J. KIEL.
LISTER HARROW.
APPLICATION FILED APR. 19, 1913.
1,080,699. Patented Dec. 9, 1913.
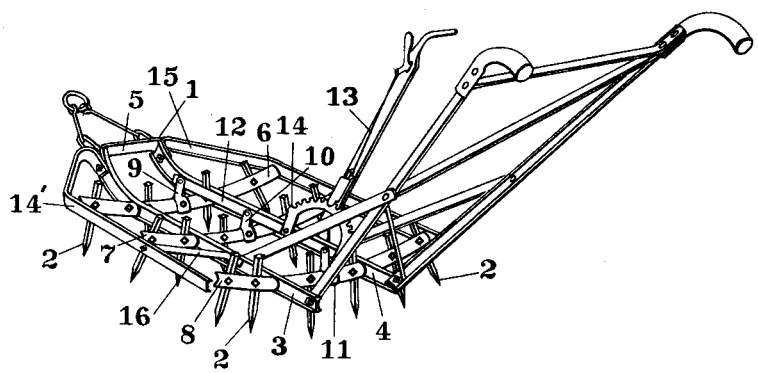
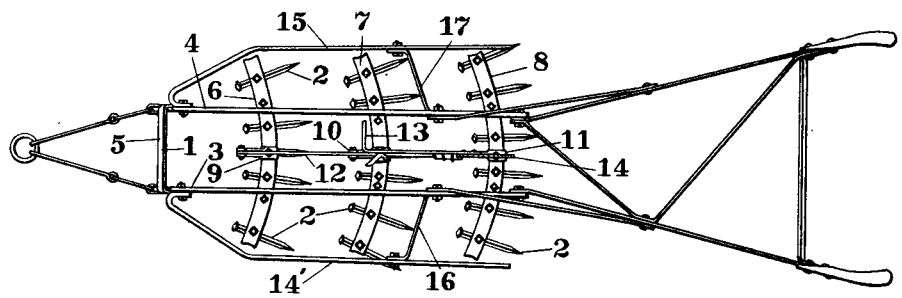
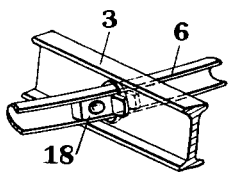

UNITED STATES PATENT OFFICE.

JOHN KIEL, OF MOLINE, ILLINOIS, ASSIGNOR TO DEERE & COMPANY, OF MOLINE, ILLINOIS, A CORPORATION OF ILLINOIS.

LISTER-HARROW.

1,080,699. Specification of Letters Patent. Patented Dec. 9, 1913.

Application filed April 19, 1913. Serial No. 762,357.

*To all whom it may concern:*

Be it known that I, JOHN KIEL, a citizen of the United States, residing at Moline, in the county of Rock Island and State of Illinois, have invented certain new and useful Improvements in Lister-Harrows, of which the following is a specification, reference being had therein to the accompanying drawing.

My invention relates to improvements in that class of agricultural implements known as lister-harrows, and used in cultivating the center and sides of a furrow simultaneously.

The object of my invention is to provide a harrow light and simple in construction, adaptable for working between rows of plants at any period of their growth.

Referring to the drawings in which similar numerals of reference indicate identical parts; Figure 1 is a perspective view showing the harrow ready for use. Fig. 2 is a plan view showing the harrow ready for transportation, and Fig. 3 is a detail.

The frame 1 has parallel side-bars 3 and 4, connected at their forward ends by a cross-bar 5, which may be integral with the side-bars, or separate and secured thereto in any suitable manner. The tooth-bars 6, 7, and 8, are preferably U-shape in cross section and are curved as shown, so that when mounted on the frame, the distance of each bar above a horizontal line will increase gradually from the longitudinal center thereof toward its ends; teeth 2 are secured to the tooth-bars by clips and bolts of well known type. I have shown the teeth as radially disposed, but it is evident they may be secured to the tooth-bars vertically and be effective in cultivation. Bifurcated filler-blocks 18 serve to prevent a lateral movement of the tooth-bars 6, 7, and 8, as shown in Fig. 3 embracing the web of the side-bars 3 and 4, and held in position by bolts. Rock-arms 9, 10 and 11 extend upwardly from the tooth bars to which they are secured, and are pivotally attached to a rocking-bar 12 extending longitudinally over the tooth-bars. Rigid with the rock-arm 11 is a lever 13, fitted with an ordinary latch engaging with a tooth-segment 14 on the rocking bar 12; by operating the lever 13 the tooth-bars 6, 7, and 8, can be rocked to govern the depth of penetration of the teeth and the desired degree of cultivation.

To prevent injury to the plants, between rows of which the harrow is used, I provide fender-bars 14' and 15 which are secured to the forward end of the harrow-frame, projecting rearwardly and parallel with the side-bars 3 and 4 of the frame, and practically of a similar length and substantially in the same plane as the ends of the tooth-bars 6, 7, and 8.

Braces 16 and 17 are rigidly secured to the side-bars 3 and 4, and the fender-bars 14' and 15, serving to strengthen the latter in their position outwardly of the ends of the tooth-bars 6, 7, and 8.

Plow-handles are secured and braced on the rear of the harrow-frame 1, and a suitable draft device is provided at the forward end of the frame.

The harrow is light and effective in operation, and the proximity of the lever to the plow-handles, within easy reach of the operator, insures quick adjustment for deep or shallow cultivation.

What I claim is—

1. In a lister-harrow, the combination with a frame, of tooth-carrying bars thereon, said tooth-carrying bars from their longitudinal center to their ends varying in height above a horizontal line.

2. In a lister harrow, the combination with a frame, of tooth-carrying bars thereon adapted to be rocked to vary the inclination of the teeth, said tooth-carrying bars varying in height above a horizontal line from their longitudinal center to their ends.

3. In a lister-harrow, the combination with a frame, having side-bars, of curved tooth-carrying bars mounted on the side-bars.

4. In a lister-harrow, the combination with a frame having side-bars, of upwardly curved tooth-carrying bars mounted on the side-bars.

5. In a lister-harrow, the combination with a frame having side-bars, of upwardly curved tooth-carrying bars mounted on the side-bars and rockable thereon.

6. In a lister-harrow, the combination with a frame having side-bars, of upwardly curved tooth-carrying bars mounted thereon and projecting beyond the side-bars.

7. In a lister-harrow, the combination with a frame having side-bars, of upwardly curved tooth-carrying bars mounted thereon, the ends of the tooth-carrying bars terminating substantially in the same horizontal plane.

8. In a lister-harrow, the combination with a frame having side-bars, of upwardly curved tooth-carrying bars mounted on the side-bars, terminating in substantially the same horizontal plane and above the side-bars.

9. In a lister-harrow, the combination with a frame having parallel side-bars, of upwardly curved tooth-carrying bars mounted on the side-bars, terminating in substantially the same horizontal plane and above the side-bars.

10. In a lister-harrow, the combination with a frame, of upwardly curved tooth-carrying bars mounted on the frame, and radially disposed teeth secured to the tooth-carrying bars.

11. In a lister-harrow, the combination with a frame, of upwardly curved tooth-carrying bars mounted on the frame, radially disposed teeth secured to the tooth-carrying bars, and a lever mechanism to rock the bars to vary the inclination of the teeth.

In testimony whereof I affix my signature in presence of two witnesses.

JOHN KIEL.

Witnesses:
MARTIN PETERSON,
W. G. DUFFIELD.

---

Copies of this patent may be obtained for five cents each, by addressing the "Commissioner of Patents, Washington, D. C."